US012566666B2

(12) United States Patent
Wei et al.

(10) Patent No.: US 12,566,666 B2
(45) Date of Patent: Mar. 3, 2026

(54) ENCODING METHOD BASED ON ERASURE CODE, AND DISTRIBUTED SYSTEM, DEVICE AND STORAGE MEDIUM

(71) Applicant: HANGZHOU ALICLOUD FEITIAN INFORMATION TECHNOLOGY CO., LTD., Hangzhou (CN)

(72) Inventors: Shuzhan Wei, Hangzhou (CN); Yafei Zhao, Hangzhou (CN); Junqing Gu, Hangzhou (CN); Yuanyuan Dong, Hangzhou (CN); Liang Chen, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/684,987

(22) PCT Filed: Nov. 8, 2022

(86) PCT No.: PCT/CN2022/130451
§ 371 (c)(1),
(2) Date: Feb. 20, 2024

(87) PCT Pub. No.: WO2023/116238
PCT Pub. Date: Jun. 29, 2023

(65) Prior Publication Data
US 2024/0354194 A1 Oct. 24, 2024

(30) Foreign Application Priority Data
Dec. 21, 2021 (CN) .......................... 202111574369.X

(51) Int. Cl.
*G06F 11/10* (2006.01)

(52) U.S. Cl.
CPC ...... *G06F 11/1088* (2013.01); *G06F 11/1004* (2013.01)

(58) Field of Classification Search
CPC ............. G06F 11/1088; G06F 11/1076; G06F 11/108; G06F 11/1008
(Continued)

(56) References Cited

U.S. PATENT DOCUMENTS

2016/0350188 A1* 12/2016 Song ...................... G06F 3/0619
2020/0127684 A1* 4/2020 Park .................. H03M 13/2942
(Continued)

FOREIGN PATENT DOCUMENTS

| CN | 112835738 A | 5/2021 |
| CN | 113296695 A | 8/2021 |

(Continued)

OTHER PUBLICATIONS

International Search Report English Translation PCT/CN2022/130451, Jan. 17, 2023, pp. 1-3.
(Continued)

*Primary Examiner* — Chae M Ko
(74) *Attorney, Agent, or Firm* — FisherBroyles, LLP; Susan M. Oiler

(57) ABSTRACT

Encoding methods based on erasure code are disclosed, and a distributed system, a device and a storage medium are provided. The method comprises: acquiring K data blocks of data to be processed; dividing the K data blocks into L data groups, wherein each data group at least comprises K encoding parameters respectively corresponding to the K data blocks, and K and L are integers greater than 1; and for each data group, performing encoding by using at least part of data blocks in other data groups and encoding parameters, which correspond to the at least part of data blocks, in the present data group, to generate a local reconstruction parity (Continued)

acquiring K data blocks of data to be processed ⌐S101 dividing the K data blocks into L data groups, wherein each data group at least comprises K encoding parameters respectively corresponding to the K data blocks, and K and L are integers greater than 1 ⌐S102 for each data group, performing encoding by using at least part of data blocks in other data groups and encoding parameters, which correspond to the at least part of data blocks, in the present data group, to generate a local reconstruction parity block of the present data group, wherein the data groups and the local reconstruction parity blocks are stored in data nodes of a distributed system ⌐S103 block of the present data group. The data groups and the local reconstruction parity blocks are stored in data nodes of a distributed system.

20 Claims, 4 Drawing Sheets

(58) Field of Classification Search
USPC ........................................................ 714/6.24
See application file for complete search history.

(56) References Cited

U.S. PATENT DOCUMENTS

| | | | |
|---|---|---|---|
| 2020/0304148 A1* | 9/2020 | Yang ................... | H03M 13/098 |
| 2021/0133026 A1* | 5/2021 | Horn ................... | G06F 11/1076 |
| 2021/0208782 A1* | 7/2021 | Zhu ..................... | G06F 11/1076 |
| 2021/0334160 A1* | 10/2021 | Mishra ............... | H03M 13/154 |
| 2022/0358008 A1* | 11/2022 | Hu ...................... | G06F 11/1004 |
| 2023/0107652 A1* | 4/2023 | Veselova ........... | G06F 16/24542 |

FOREIGN PATENT DOCUMENTS

| | | |
|---|---|---|
| CN | 113687975 A | 11/2021 |
| CN | 114385409 A | 4/2022 |

OTHER PUBLICATIONS

Li, Research on Optimization of HDFS Erasure Coding, Chinese Master's Theses Full-text Database, Information Science and Technology, Jan. 15, 2019, pp. 1-76.
Chong, Study on the Repair of Failure Node in Distributed Storage Systems, Chinese Master's Theses Full-text Database, Information Science and Technology, Jan. 15, 2019, pp. 1-57.
The First Office Action English Translation, Chinese Application No. 202111574369X, Jul. 29, 2025, 12 pages.
Search Report English Translation, Chinese Application No. 202111574369X, Jul. 29, 2025, 1 page.
Xin, Research on Distributed Storage Coding Based on the Piggybacking Framework, Xi'an University Master's Degree Thesis, Apr. 2019, 6 pages.

* cited by examiner

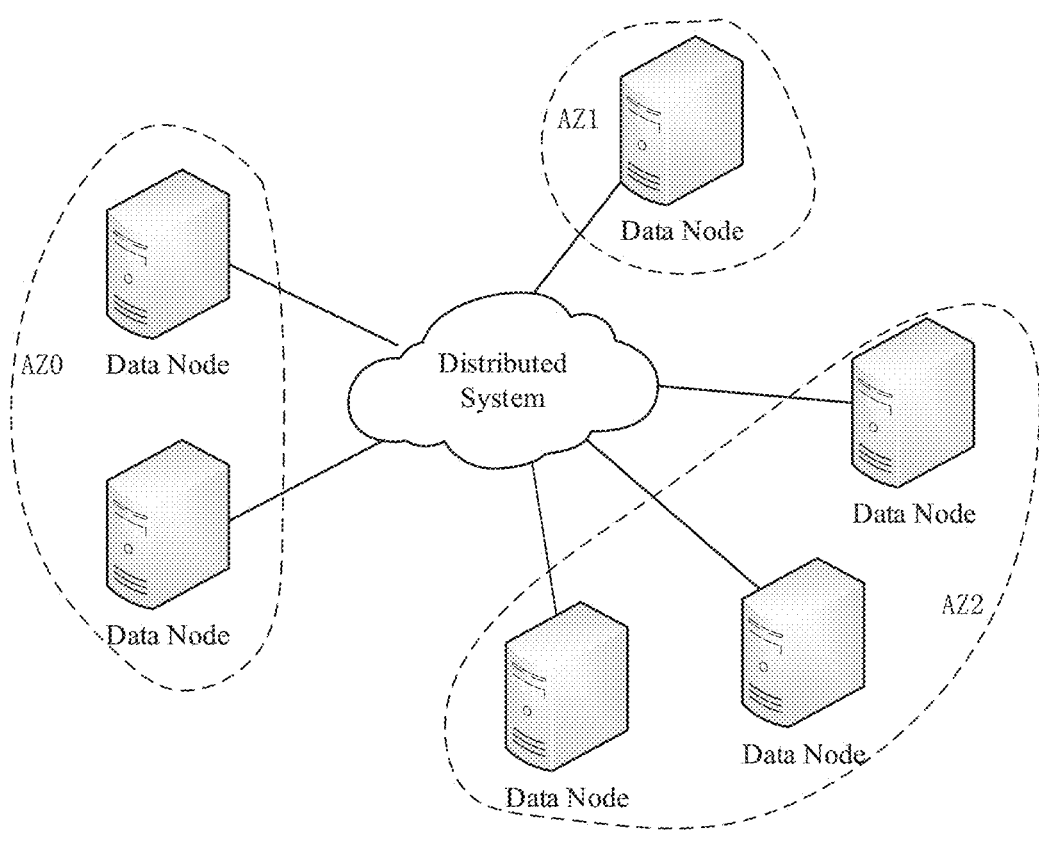

FIG. 3

| acquiring K data blocks of data to be processed | S101 |

| dividing the K data blocks into L data groups, wherein each data group at least comprises K encoding parameters respectively corresponding to the K data blocks, and K and L are integers greater than 1 | S102 |

| for each data group, performing encoding by using at least part of data blocks in other data groups and encoding parameters, which correspond to the at least part of data blocks, in the present data group, to generate a local reconstruction parity block of the present data group, wherein the data groups and the local reconstruction parity blocks are stored in data nodes of a distributed system | S103 |

FIG. 4

ENCODING METHOD BASED ON ERASURE CODE, AND DISTRIBUTED SYSTEM, DEVICE AND STORAGE MEDIUM

RELATED APPLICATIONS

The present invention is filed under 35 U.S.C. § 371 as the U.S. national phase of International Patent Application No. PCT/CN2022/130451, filed Nov. 8, 2022, which designated the United States and which claims the benefit of Chinese patent application No. 202111574369.X, filed Dec. 21, 2021, which is incorporated herein by reference in its entirety.

TECHNICAL FIELD

One or more embodiments of this specification relate to the field of computer data processing, and especially to an encoding method based on erasure code, a distributed system, a device and a storage medium.

BACKGROUND

Storage scale of a distributed system is becoming increasingly large, which is a loosely coupled system composed of a plurality of data nodes interconnected through communication lines.

Erasure code is a fault-tolerant encoding technology, and its fundamental principle involves fragmenting stored data, generating, from k pieces of original data obtained through fragmentation, k+m pieces of data through a certain verification calculation manner, and making the original data restorable from any k pieces of data out of the k+m pieces of data. In this way, even if some data is lost, the distributed system can still recover the original data.

Erasure code technology may minimize the storage overhead of a system on the premise of ensuring data reliability. Therefore, to reduce the storage space occupied by data in a distributed system, erasure code technology is applied to data storage in the distributed system.

However, for data stored based on existing erasure code technology, when some data is lost, a system needs to read a sufficient amount of data to recover the data required by a user, which, in one aspect, leads to an amplification of input/output per second (IOPS), and, in another aspect, significantly consumes bandwidth during data repair.

SUMMARY

In light of this, one or more embodiments of this specification provide an encoding method based on erasure code, a distributed system, a device and a storage medium.

To meet the above purposes, one or more embodiments of this specification provide the following technical solutions.

According to a first aspect of one or more embodiments of this specification, there is provided an encoding method based on erasure code, comprising: acquiring K data blocks of data to be processed; dividing the K data blocks into L data groups, wherein each data group at least comprises K encoding parameters respectively corresponding to the K data blocks, and K and L are integers greater than 1; and for each data group, performing encoding by using at least part of data blocks in other data groups and encoding parameters, which correspond to the at least part of data blocks, in the present data group, to generate a local reconstruction parity block of the present data group, wherein the data groups and the local reconstruction parity blocks thereof are stored in data nodes of a distributed system.

According to a second aspect of one or more embodiments of this specification, there is provided a distributed system, comprising: several data nodes, wherein the data nodes are in communication connection with a client, and the data nodes or the client are configured to: acquire K data blocks of data to be processed; divide the K data blocks into L data groups, wherein each data group at least comprises K encoding parameters respectively corresponding to the K data blocks, and K and L are integers greater than 1; and for each data group, perform encoding by using at least part of data blocks in other data groups and encoding parameters, which correspond to the at least part of data blocks, in the present data group, to generate a local reconstruction parity block of the present data group, wherein the data groups and the local reconstruction parity blocks thereof are stored in the data nodes of the distributed system.

According to a third aspect of one or more embodiments of this specification, there is provided a computer device, comprising: a processor; and a memory for storing processor-executable instructions, wherein the processor runs the executable instructions to implement any method in the first aspect.

According to a fourth aspect of one or more embodiments of this specification, there is provided a computer-readable storage medium, storing computer instructions that, when executed by a processor, implement the steps of any method in the first aspect.

The above summary is only for the purpose of illustration and is not intended to make limitations in any way. In addition to the schematic aspects, implementations and features described above, further aspects, implementations and features of the present application will be readily understood with reference to the drawings and the following detailed description.

BRIEF DESCRIPTION OF THE DRAWINGS

In the drawings, unless otherwise specified, the same reference numerals throughout several drawings denote the same or similar parts or elements. These drawings may not necessarily be drawn to scale. It should be understood that these drawings only depict some implementations disclosed according to the present application and should not be regarded as limitations of the scope of the present application.

FIG. 3 is a structural schematic diagram of a distributed system, when deployed in a multi-AZ environment, provided in an exemplary embodiment.

FIG. 4 is a flow chart of an encoding method based on erasure code provided in an exemplary embodiment.

DETAILED DESCRIPTION

Figure 1:
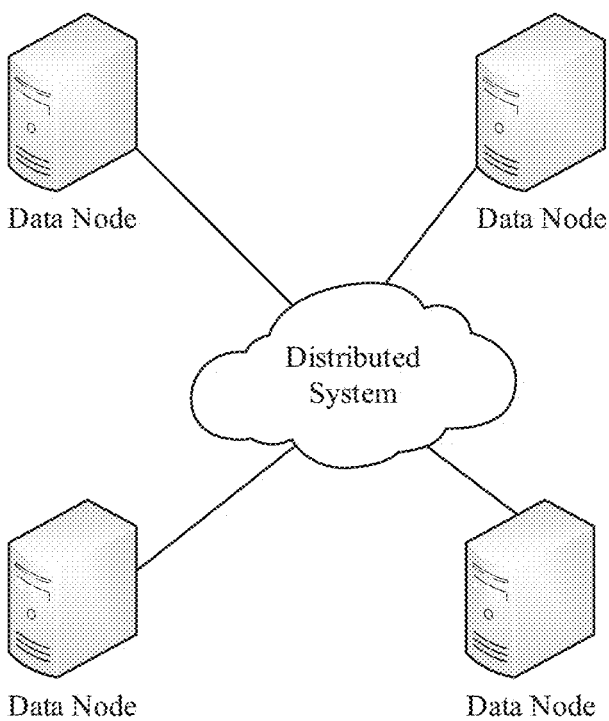
FIG. 1 is a structural schematic diagram of a distributed system provided in an exemplary embodiment.

Exemplary embodiments will be explained here in detail, examples of which are illustrated in the drawings. When the following description refers to the drawings, the same numerals in different drawings denote the same or similar elements, unless indicated otherwise. The implementations described in the following exemplary embodiments do not represent all of implementations consistent with one or more embodiments of this specification. Rather, they are merely examples of apparatuses and methods consistent with some aspects of one or more embodiments of this specification as detailed in the appended claims.

It should be explained that in other embodiments, steps of a corresponding method are not necessarily executed in an order shown and described in this specification. In some other embodiments, methods therein may comprise more or fewer steps than those described in this specification. In addition, a single step described in this specification may be broken down into multiple steps for description in other embodiments; while multiple steps described in this specification may also be combined into a single step for description in other embodiments.

The storage scale of distributed systems is becoming increasingly large. With reference to FIG. 1, a distributed system is a loosely coupled system composed of a plurality of data nodes interconnected through communication lines. Each data node is one computer device that can independently process a certain transaction.

Erasure code is a fault-tolerant encoding technology, and its fundamental principle involves fragmenting stored data, generating, from k pieces of original data obtained through fragmentation, k+m pieces of data through a certain verification calculation manner, and making the original data restorable from any k pieces of data out of the k+m pieces of data. In this way, even if some data is lost, a distributed system can still recover the original data.

Erasure code technology may minimize the storage overhead of a system on the premise of ensuring data reliability. Therefore, to reduce the storage space occupied by data in a distributed system, erasure code technology is applied to data storage in the distributed system. However, for data stored based on existing erasure code technology, when some data is lost, a system needs to read a sufficient amount of data to recover the data required by a user, which, in one aspect, leads to an amplification of input/output per second (IOPS), and, in another aspect, significantly consumes bandwidth during data repair.

Figure 2:
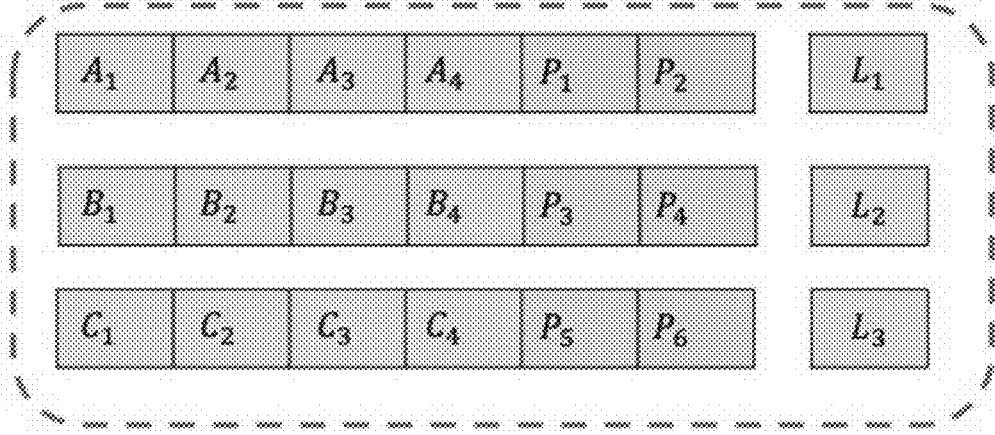
FIG. 2 is a schematic diagram of encoded groups obtained by an encoding mode based on erasure code in related technologies.

By taking an LRC (Locally Repairable Codes) erasure code as an example, LRC is a local parity encoding method, and its core idea is to divide parity blocks into a global parity block and a local reconstruction parity block, which may be calculated in groups during failure recovery. LRC encoding is generally expressed as LRC (k, z, g), where k represents a total number of data blocks, z represents the number of local reconstruction parity blocks, and g represents the number of global parity blocks. As shown in FIG. 2, by taking an LRC (12, 3, 6) erasure code as an example, it means that there are 12 data blocks, 3 local reconstruction parity blocks and 6 global parity blocks. In FIG. 2, global parity blocks $P_1$~$P_6$ are generated by encoding a total of 12 data blocks $A_1$-$A_4$, $B_1$-$B_4$, $C_1$-$C_4$. Moreover, data blocks $A_1$-$A_4$ and global parity blocks $P_1$, $P_2$ are used for generating a local reconstruction parity block $L_1$ through XOR, data blocks $B_1$-$B_4$ and global parity blocks $P_3$, $P_4$ are used for generating a local reconstruction parity block $L_2$ through XOR, and data blocks $C_1$-$C_4$ and global parity blocks $P_5$, $P_6$ are used for generating a local reconstruction parity block $L_3$ through XOR. Data block $A_1$-$A_4$, global parity blocks $P_1$, $P_2$ and local reconstruction parity block $L_1$ constitute a first encoded group; data blocks $B_1$-$B_4$, global parity blocks $P_3$, $P_4$ and local reconstruction parity block $L_2$ constitute a second encoded group, and data blocks $C_1$-$C_4$, global parity blocks $P_5$, $P_6$ and local reconstruction parity block $L_3$ constitute a third encoded group. The three encoded groups are stored in different data nodes. In a case that one of the data nodes (e.g., the one used for storing the first encoded group) fails, when a user desires to read data block $A_1$, it needs to read a total of 12 data blocks $B_1$-$B_4$, $C_1$-$C_4$, and $P_3$-$P_6$ from other data nodes to recover data in data block $A_1$, which, in one aspect, leads to an amplification of input/output per second (IOPS), and, in another aspect, significantly consumes bandwidth during data repair. This problem becomes increasingly severe as the number of data copies in erasure code strips rises.

Based on this, an embodiment of this specification provides an encoding method based on erasure code, whereby after acquiring K data blocks obtained by fragmenting data to be processed, the K data blocks can be divided into L data groups, and then when acquiring a local reconstruction parity block of each group of data blocks, at least part of data blocks in other data groups may be used for generating a local reconstruction parity block of the present data group, such that data recovery of a certain abnormal data block, when necessary, may be performed with the help of a local reconstruction parity block in other data groups, which is generated by using this abnormal data block, and other data blocks that generate this local reconstruction parity block, while the data security of a user is ensured, without the need of reading multiple global parity blocks and all data blocks in other data nodes as shown in FIG. 2, and thus the number of blocks need to be read is reduced, thereby lowering the amplification of IOPS for data recovery when data is lost or abnormal, and also reducing bandwidth loss during data recovery, and helping to improve the data recovery efficiency.

In an exemplary application scenario, as users have increasingly higher requirements for data reliability, related technologies support storage in a multi-AZ (Availability Zones) manner, that is, a distributed system is deployed in a multi-AZ environment. AZ (Availability Zone) refers to a physical zone in the same region where power and network are independent from each other. The multi-AZ (Availability Zones) solution is to disperse data to a plurality of separate data centers and ensure that the data remains available when a single AZ encounters a computer room failure or network device failure. When the distributed system is deployed in a multi-AZ environment, the distributed system comprises several data nodes, and each AZ comprises one or more data nodes of the distributed system. In an example, with reference to FIG. 3, a distributed system with 7 data nodes is deployed in an environment with 3 AZs, where AZ0 comprises 2 data nodes, AZ1 comprises 1 data node, and AZ2 comprises 3 data nodes.

In order to reduce the storage space occupied by data in multi-AZ storage, erasure code technology is applied to multi-AZ data storage. When a computer room failure or network device failure occurs in a single AZ, the system may acquire data from other computer rooms and use erasure code technology to recover abnormal data to provide it to a user. In the erasure code strip shown in FIG. 2, data blocks $A_1$-$A_4$, global parity blocks $P_1$, $P_2$ and local reconstruction parity block $L_1$ constitute a first encoded group, data blocks $B_1$-$B_4$, global parity blocks $P_3$, $P_4$ and local reconstruction parity block $L_2$ constitute a second encoded group, and data blocks $C_1$-$C_4$, global parity blocks $P_5$, $P_6$ and local reconstruction parity block $L_3$ constitute a third encoded group. The three encoded groups are stored in data nodes of three different AZs respectively, that is, each AZ is used for storing one of the encoded groups, and it is possible to store this encoded group in some or all data nodes in each AZ. For example, on the basis of the embodiment of FIG. 3, the first encoded group is stored in a data node of AZ0, the second encoded group is stored in a data node of AZ1, and the third encoded group is stored in a data node of AZ2. In a case that a failure arises in AZ0, if it needs to read data block $A_1$, a total of 12 data blocks $B_1$-$B_4$, $C_1$-$C_4$, and $P_3$-$P_6$ need to be read from other AZs, so as to recover data in data block $A_1$, which causes a significant amplification of IOPS.

Based on this, it is possible to use the encoding method based on erasure code provided in the embodiments of this specification, whereby after acquiring K data blocks obtained by fragmenting data to be processed, the K data blocks can be divided into L data groups, and then when acquiring a local reconstruction parity block of each group of data blocks, at least part of data blocks in other data groups may be used for generating a local reconstruction parity block of the present data group. For example, L data groups and their local reconstruction parity blocks are stored in data nodes of L different AZs respectively; when an abnormity arises in any AZ, if it desires to read a target data block stored in the abnormal AZ, we may use a local reconstruction parity block in other AZs, which is generated using the target data block, and other part of data blocks generating this local reconstruction parity block to recover abnormal data blocks, reducing the total number of data blocks or parity blocks that need to be read when data recovery is performed, and thereby lowering bandwidth consumption and IOPS during data repair.

The encoding method based on erasure code provided in the embodiments of this specification may be applied to a client in the distributed system; and/or, when the distributed system has several data nodes, the encoding method based on erasure code may also be applied to at least one data node.

Next, the encoding method based on erasure code provided in the embodiments of this specification will be explained. With reference to FIG. 4, the method comprises the following steps S101 to S103.

At step S101, K data blocks of data to be processed are acquired.

At step S102, the K data blocks are divided into L data groups, wherein each data group at least comprises K encoding parameters respectively corresponding to the K data blocks, and K and L are integers greater than 1.

At step S103, for each data group, encoding is performed by using at least part of data blocks in other data groups and encoding parameters, which correspond to the at least part of data blocks, in the present data group, to generate a local reconstruction parity block of the present data group, wherein the data groups and the local reconstruction parity blocks thereof are stored in data nodes of a distributed system.

It can be understood that the embodiments of this specification do not make any limitations on a specific type of the data to be processed, which may be specifically set according to actual application scenarios. Exemplarily, the data to be processed may be a data request, and this data request may be further divided into K sub-requests, each serving as one data block. Exemplarily, the data to be processed may also be transaction data to be stored, and the transaction data may be fragmented to acquire K data blocks. Exemplarily, the data to be processed may also be user registration data, and the user registration data may be fragmented to acquire K data blocks, where K is an integer greater than 1.

After acquiring K data blocks of the data to be processed, the K data blocks may be divided into L data groups, where L is an integer greater than 1. Exemplarily, in a distributed system with several data nodes, for example, the number of data groups into which the K data blocks may be divided may be determined according to the number of data nodes. For example, one data node is used for storing an encoded group consisting of data blocks, a local reconstruction parity block, and a global parity block of one data group. This embodiment makes no limitation in this regard.

Exemplarily, in a multi-AZ environment, the number of the data groups may also be determined according to the number of the AZs. Assuming that one AZ is used for storing an encoded group consisting of data blocks, a local reconstruction parity block, and a global parity block of one data group, it is possible to set the number of data groups to be less than or equal to the number of AZs. In an example, assuming that there are 3 AZs in the multi-AZ environment, namely AZ0, AZ1 and AZ2, K data blocks may be divided into up to 3 groups, and after a local reconstruction parity block and a global parity block of each data group are generated, the data blocks, the local reconstruction parity block and the global parity block of the data group are combined to obtain an encoded group, such that there are a total of 3 encoded groups. Assuming that they are encoded group 1, encoded group 2 and encoded group 3 respectively, encoded group 1 may be stored in a data node of AZ0, encoded group 2 may be stored in a data node of AZ1, and encoded group 3 may be stored in a data node of AZ2.

In some embodiments, in the L data groups obtained by division, each data group at least comprises K encoding parameters respectively corresponding to the K data blocks. The K encoding parameters may be used for combining with the data blocks to generate a local reconstruction parity block and a global parity block.

In an implementation, for generation of the global parity block, by taking generation of one global parity block as an example, for each data group, encoding may be performed according to the K data blocks and the K encoding parameters to generate one global parity block of the present encoded data group. In a case where at least two global parity blocks need to be generated, each data group may comprise at least two parameter groups, the parameter groups comprising K encoding parameters which respectively correspond to the K data blocks, and encoding parameters in different parameter groups are different, such that encoding may be performed according to the K data blocks with at least two different parameter groups respectively, to generate at least two global parity blocks of the present encoded data group.

In an exemplary application scenario, in a multi-AZ environment, assuming that a data node in one AZ is used for storing one encoded group that comprises data blocks, a local reconstruction parity block and a global parity block of one data group, each encoded group at least has one global parity block, that is to say, the number of global parity blocks may be in a multiple relationship with the number of AZs used for storing encoded groups. If each AZ that stores an encoded group may correspond to one or more global parity blocks, each data group may comprise one or more parameter groups, the parameter groups comprising K encoding parameters which respectively correspond to K data blocks, and encoding parameters in different parameter groups are different, such that different global parity blocks of the data group may be generated based on the K data blocks and different parameter groups.

This embodiment does not make any limitations on a specific encoding mode of the global parity block, which may be specifically set according to actual application scenarios. In an example, the global parity block may be determined according to the sum of respective products of the K data blocks and the K encoding parameters in the data group. In another example, the global parity block may be determined according to the sum of respective ratios of the K data blocks to the K encoding parameters in the data group.

Figure 5:
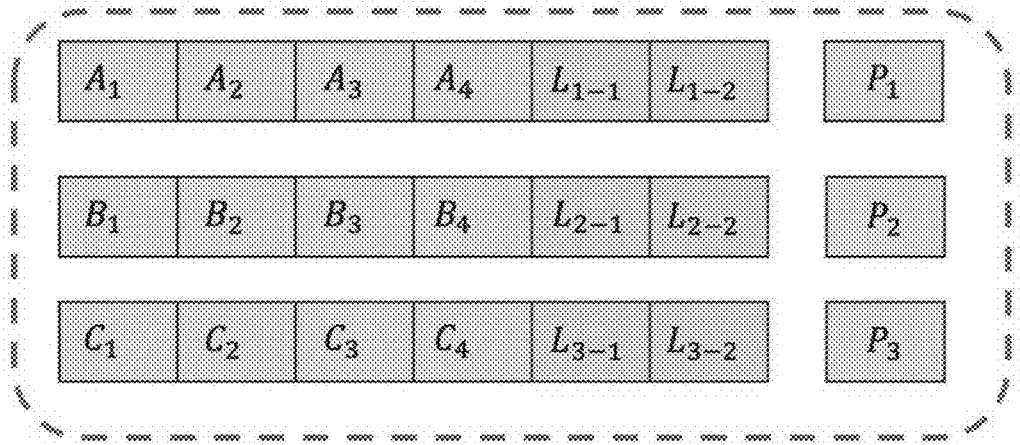
FIG. 5 is a schematic diagram of encoded groups provided in an exemplary embodiment, which are obtained by using an encoding method based on erasure code provided in an embodiment of this specification.

Exemplarily, with reference to FIG. 5, by taking determination of a global parity block according to the sum of respective products of the K data blocks and the K encoding parameters in the data group as an example, the data to be processed is fragmented into 12 data blocks, and then the 12 data blocks are divided into 3 data groups a, b, and c, namely $a=\{A_1,A_2,A_3,A_4\}$, $b=\{B_1,B_2,B_3,B_4\}$ and $c=\{C_1,C_2,C_3,C_4\}$. In a multi-AZ environment, with reference to FIG. 6, by taking 3 data groups being stored in 3 different AZs as an example, it is assumed that data group a is stored in AZ0, data group b is stored in AZ1, and data group c is stored in AZ2. Assuming that each AZ that stores a data group needs to correspond to one global parity block, each data group comprises one parameter group, and the parameter group comprises 12 encoding parameters respectively corresponding to 12 data blocks. For example, data group a comprises 4 data blocks and 1 parameter group, and this parameter group is $Fx=\{x1, x2,x3,x4,x5,x6,x7,\times8,\times9,\times10,x11,\times12\}$; data group b comprises 4 data blocks and 1 parameter group, and this parameter group is $Fy=\{y1,y2,y3,y4,y5,y6,y7,y8, y9,y10,y11,y12\}$; and data group c comprises 4 data blocks and 1 parameter group, and this parameter group is $Fz=\{z1, z2,z3,z4,z5,z6,z7,z8,z9,z10,z11,z12\}$.

Then a global parity block corresponding to data group a is $P_1=Fx$ $(A_1,A_2,A_3,A_4,B_1,B_2,B_3,B_4,C_1,C_2,C_3,C_4)=x1*A_1+x2*A_2+x3*A_3+x4*A_4+x5*B_1+x6*B_2+x7*B_3+x8*B_4+x9*C_1+x10*C_2+x11*C_3+x12*C_4$.

A global parity block corresponding to data group b is $P_2=Fy$ $(A_1,A_2,A_3,A_4,B_1,B_2,B_3,B_4,C_1,C_2,C_3,C_4)=y1*A_1+y2*A_2+y3*A_3+y4*A_4+y5*B_1+y6*B_2+y7*B_3+y8*B_4+y9*C_1+y10*C_2+y11*C_3+y12*C_4$.

A global parity block corresponding to data group c is $P_3=Fz(A_1,A_2,A_3,A_4,B_1,B_2,B_3,B_4,C_1,C_2,C_3,C_4)=z1*A_1+z2*A_2+z3*A_3+z4*A_4+z5*B_1+z6*B_2+z7*B_3+z8*B_4+z9*C_1+z10*C_2+z11*C_3+z12*C_4$.

In an implementation, regarding generation of a local reconstruction parity block, for each data group, encoding may be performed by using at least part of data blocks in other data groups and encoding parameters, which correspond to the at least part of data blocks, in the present data group, to generate a local reconstruction parity block of the present data group. The number of local reconstruction parity blocks in a data group is in a multiple relationship with the number of data blocks in the data group. Moreover, the number of part of data blocks in the other data groups used by the local reconstruction parity block may be determined according to the multiple relationship. Exemplarily, a value of the number of part of data blocks in other data groups is equal to a value of the multiple. In an example, assuming that the number of data blocks in a data group is 8, the number of local reconstruction parity blocks is 2, and the multiple between the number of data blocks and the number of local reconstruction parity blocks in the data group is 4, then the number of the part of data blocks in other data groups for generating the local reconstruction parity blocks may be 4.

For a data group, other data groups used for generating a local reconstruction parity block of the present data group may be all or some data groups except the present data group.

Additionally, in order to further reduce the total number of data blocks and local reconstruction parity blocks that need to be read during subsequent data recovery, the number of local reconstruction parity blocks may be set to be less than or equal to the number of data blocks in the data group. In an example, assuming that the number of data blocks in a data group is 4, the number of local reconstruction parity blocks may be 2 or 4. In another example, assuming that the number of data blocks in a data group is 6, the number of local reconstruction parity blocks may be 2, 3 or 6.

In some embodiments, for each data group, if at least two local reconstruction parity blocks are generated, and part of data blocks used to respectively generate the at least two local reconstruction parity blocks are different from each other, this achieves that different data blocks have local reconstruction parity blocks related thereto, such that when a data block is lost subsequently or an AZ where the data group is stored is abnormal, this lost data block may be recovered according to a local reconstruction parity block related to the lost data block. In an example, assuming that there are 2 data groups a and b, the number of data blocks in the data group is 4, the number of local reconstruction parity blocks is 2, and the multiple between the number of data blocks in the data group and the number of local reconstruction parity blocks is 2, then it is possible to use 2 data blocks in data group b and encoding parameters in data group a which correspond to these 2 data blocks, to generate a first local reconstruction parity block of data group a, and use the other 2 data blocks in data group b, which are different from the above two data blocks, and encoding parameters in data group a which correspond to the other two data blocks, to generate a second local reconstruction parity block of data group a.

This embodiment does not make any limitations on a specific encoding mode of the local reconstruction parity block, which may be specifically set according to actual application scenarios. In an example, the local reconstruction parity block may be determined according to the sum of respective products of part of data blocks and corresponding encoding parameters. In another example, the local reconstruction parity block may be determined according to the sum of respective ratios of part of data blocks to corresponding coding parameters.

Figure 6:
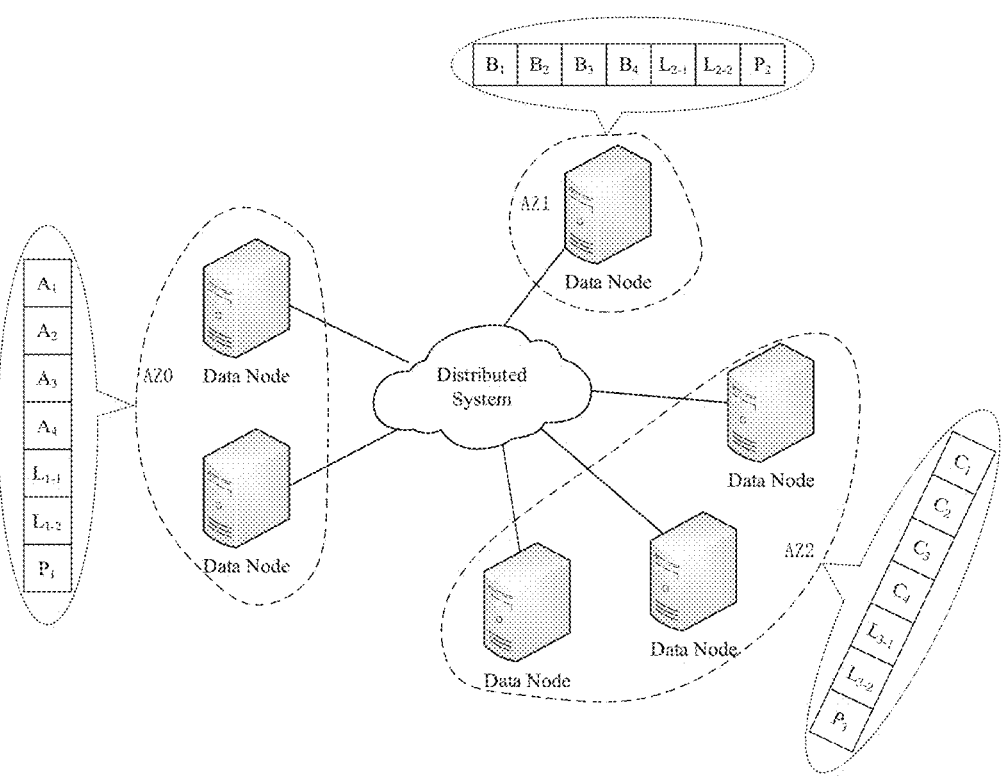
FIG. 6 is a schematic diagram of encoded groups, when stored in data nodes in AZs, provided in an exemplary embodiment.

Exemplarily, with reference to FIG. 5 and FIG. 6, assuming that each data group has 4 data blocks, and 2 local reconstruction parity blocks are set, the multiple between the number of data blocks in the data group and the number of local reconstruction parity blocks is 2, and 2 data blocks in other data groups may be used for generating one local reconstruction parity block. Assuming that the other data groups are all data groups except the present data group, two local reconstruction parity blocks $L_{1-1}$ and $L_{1-2}$ of data group a may be generated by using 2 data blocks in data group b and 2 data blocks in data group c respectively, and data blocks that are used for generating the two local reconstruction parity blocks $L_{1-1}$ and $L_{1-2}$ are different, for example, $L_{1-1}=x5*B_1+x6*B_2+x9*C_1+x10*C_2$, and $L_{1-2}=x7*B_3+x8*B_4+x11*C_3+x12*C_4$. As may be understood, to generate local reconstruction parity block $L_{1-1}$, data blocks as used are not limited to $B_1$, $B_2$, $C_1$, and $C_2$, but may also be $B_3$, $B_4$, $C_3$, and $C_4$, or $B_1$, $B_2$, $C_3$, and $C_4$, as long as local reconstruction parity block $L_{1-1}$ and local reconstruction parity block $L_{1-2}$ are generated using different data blocks. This embodiment does not make any limitations in this regard. This achieves that each data block has a local reconstruction parity block related thereto, such that when a data block is lost subsequently, the lost data block may be recovered based on the local reconstruction parity block related to the lost data block, and other data blocks that are used for generating this local reconstruction parity block.

Analogously, two local reconstruction parity blocks $L_{2-1}$ and $L_{2-2}$ of data group b may be generated by using 2 data blocks in data group a and 2 data blocks in data group c respectively. The local reconstruction parity block $L_{2-1}$ and local reconstruction parity block $L_{2-2}$ are generated by using different data blocks. For example, data blocks $A_1$, $A_2$, $C_1$ and $C_2$ are used for generating local reconstruction parity block $L_{2-1}$, namely $L_{2-1}=y1*A_1+y2*A_2+y9*C_1+y10*C_2$; and data blocks $A_3$, $A_4$, $C_3$ and $C_4$ are used for generating local reconstruction parity block $L_{2-2}$, namely $L_{2-2}=y3*A_3+y4*A_4+y11*C_3+y12*C_4$. Analogously, two local reconstruction parity blocks $L_{3-1}$ and $L_{3-2}$ of data group c may be generated by using 2 data blocks in data group a and 2 data blocks in data group b respectively. The local reconstruction parity block $L_{3-1}$ and local reconstruction parity block $L_{3-2}$ are generated by using different data blocks. For example, data blocks $A_1$, $A_2$, $B_1$ and $B_2$ may be used for generating local reconstruction parity block $L_{3-1}$, namely $L_{3-1}=z1*A_1+z2*A_2+z5*B_1+z6*B_2$; data blocks $A_3$, $A_4$, $C_3$ and $C_4$ are used for generating local reconstruction parity block $L_{3-2}$, namely $L_{3-2}=z3*A_3+z4*A_4+z7*B_3+z8*B_4$.

In some implementations, for a data group, if other data groups used for generating a local reconstruction parity block of the present data group are all data groups except the present data group, and one or more local reconstruction parity blocks of the present data group are generated by using all data blocks in the other data groups, the one or more local reconstruction parity blocks of the data group have already contain information of all data blocks in the other data groups. Therefore, a global parity block of the present data group may be generated according to data blocks and corresponding encoding parameters in the present data group, and one or more local reconstruction parity blocks.

In an example, with reference to FIG. 5 and FIG. 6, a global parity block corresponding to data group a is $P_1=x1*A_1+x2*A_2+x3*A_3+x4*A_4+L_{1-1}+L_{1-2}$; a global parity block corresponding to data group b is $P_2=y5*B_1+y6*B_2+y7*B_3+y8*B_4+L_{2-1}+L_{2-2}$; and a global parity block corresponding to data group c is $P_3=z9*C_1+z10*C_2+z11*C_3+z12*C_4+L_{3-1}+L_{3-2}$.

In some embodiments, in a case that each data group comprises one parameter group, encoding parameters in this parameter group may be used for generating a local reconstruction parity block of the data group. In a case that each data group comprises at least two parameter groups, one of the parameter groups may be selected to generate a local reconstruction parity block of the data group, or at least two local reconstruction parity blocks of the data group may be generated according to the two parameter groups respectively.

In some embodiments, after generating the local reconstruction parity block and global parity block of a data group, L encoded groups corresponding to L data groups may be acquired, each encoded group comprising data blocks, a local reconstruction parity block and a global parity block of one of the data groups; and the L encoded groups are in one-to-one correspondence with the L data groups, and then the L encoded groups may be stored in data nodes of the distributed system.

Exemplarily, the distributed system is deployed in a multi-AZ environment, each AZ comprising one or more data nodes; wherein each AZ corresponds to at least one encoded group, and the at least one encoded group is stored in one or more data nodes in this AZ. On the basis of the embodiment of FIG. 5, with reference to FIG. 6, the embodiment shown in FIG. 5 may obtain 3 encoded groups, with a first encoded group $\{A_1, A_2, A_3, A_4, L_{1-1}, L_{1-2}, P_1\}$ stored in a data node of AZ0, a second encoded group $\{B_1, B_2, B_3, B_4, L_{2-1}, L_{2-2}, P_2\}$ stored in a data node of AZ1, and a third encoded group $\{C_1, C_2, C_3, C_4, L_{3-1}, L_{3-2}, P_3\}$ stored a data node of AZ2.

In some embodiments, when a certain data block in the same AZ is lost, it may be recovered by using data blocks, a local reconstruction parity block and a global parity block in the same AZ. For example, in the embodiments of FIG. 5 and FIG. 6, $P_1$ may be calculated from data blocks $A_1\sim A_4$ and local reconstruction parity blocks $L_{1-1}$ and $L_{1-2}$. When data block $A_1$ is lost, $A_1$ may be calculated based on global parity block $P_1$, local reconstruction parity blocks $L_{1-1}$ and $L_{1-2}$, data blocks $A_2$, $A_3$, $A_4$, and encoding parameters corresponding to $A_1\sim A_4$, that is, $P_1$, $L_{1-1}$, $L_{1-2}$, $A_2$, $A_3$, $A_4$ and encoding parameters (x1,x2,x3,x4) corresponding to $A_1\sim A_4$ are known items, and $A_1$ is an unknown item, then $$A_1 = \frac{P_1 - L_{1-1} - L_{1-2} - x2*A_2 - x3*A_3 - x4*A_4}{x1}.$$

In some embodiments, when abnormality arises in any AZ, if it needs to read a target data block stored in a data node of the AZ where the abnormality arises, a target local reconstruction parity block generated by using the target data block, and other data blocks for generating the target local reconstruction parity block are read from data nodes of other AZs; and then the target local reconstruction parity block and other data blocks for generating the target local reconstruction parity block are used to recover the target data block. In this embodiment, since a local reconstruction parity block is generated from at least part of data blocks of other data groups, the total number of data blocks or local reconstruction parity blocks that need to be read during data recovery is reduced, thereby lowering bandwidth consumption and IOPS during data repair, and also helping to improve the data recovery efficiency.

Exemplarily, in the embodiments of FIG. 5 and FIG. 6, for example, assuming that abnormality arises in AZ0, if there is a desire to read data block $A_1$ or $A_2$, they may be recovered according to local reconstruction parity blocks $L_{2-1}$ and $L_{3-1}$ generated by using data block $A_1$ or $A_2$, and other data blocks $C_1$, $C_2$, $B_1$ and $B_2$ used for generating local reconstruction parity blocks $L_{2-1}$ and $L_{3-1}$, then $y1*A_1+y2*A_2=L_{2-1}-y9*C_1-y10*C_2$; $y1*A_1+y2*A_2=L_{3-1}-z5*B_1-z6*B_2$. Data block $A_1$ or $A_2$ may be recovered only by reading from other AZs a total of 6 blocks including 2 local reconstruction parity blocks and 4 data blocks, such that the number of blocks that need to be read is reduced, which not only lowers the amplification of IOPS when there is an AZ failure, but also helping to reduce bandwidth loss during data recovery and improve the data recovery efficiency, while ensuring the security of user data.

Correspondingly, this specification further provides a distributed system, comprising several data nodes, wherein the data nodes are in communication connection with a client, and the data nodes or the client are configured to: acquire K data blocks of data to be processed; divide the K data blocks into L data groups, wherein each data group at least comprises K encoding parameters respectively corresponding to the K data blocks, and K and L are integers greater than 1; and for each data group, perform encoding by using at least part of data blocks in other data groups and encoding parameters, which correspond to the at least part of data blocks, in the present data group, to generate a local reconstruction parity block of the present data group, wherein the data groups and the local reconstruction parity block thereof are stored in the data nodes of the distributed system.

In an embodiment, the data nodes or the client are configured to: for each data group, perform encoding according to the K data blocks and the K encoding parameters, to generate a global parity block of the present data group; or, in a case that one or more local reconstruction parity blocks of the present data group are generated by using all data blocks in other data groups, generate a global parity block of the present data group according to data blocks in the present data group and corresponding encoding parameters, and the one or more local reconstruction parity blocks.

In an embodiment, the data nodes or the client are configured to: acquire L encoded groups after generating the global parity block, wherein each of the encoded groups comprises the data blocks, the local reconstruction parity block and the global parity block of one of the data groups; and store the L encoded groups in the data nodes of the distributed system.

In an embodiment, the distributed system is deployed in a multi-AZ environment, and each AZ comprises one or more data nodes.

Each AZ corresponds to at least one encoded group, and the at least one encoded group is stored in one or more data nodes in the AZ.

In an embodiment, the data nodes or the client are configured to: if it needs to read a target data block stored in a data node of an AZ where abnormity arises, read, from data nodes of other AZs, a target local reconstruction parity block generated by using the target data block, and other data blocks for generating the target local reconstruction parity block; and recover the target data block by using the target local reconstruction parity block and the other data blocks for generating the target local reconstruction parity block.

In an embodiment, for each data group, if at least two local reconstruction parity blocks are generated, the part of data blocks used for respectively generating the at least two local reconstruction parity blocks are different from each other.

In an embodiment, the number of local reconstruction parity blocks in the data group is in a multiple relationship with the number of data blocks in the data group; wherein the number of the part of data blocks in the other data groups, which are used by the local reconstruction parity blocks, is determined according to the multiple relationship.

In an embodiment, the local reconstruction parity block is determined according to the sum of respective products of the part of data blocks and corresponding encoding parameters; and/or the global parity block is determined according to the sum of respective products of the K data blocks and the K encoding parameters.

In an embodiment, the number of the data groups is determined according to the number of the AZs; and/or, the number of the global parity blocks is in a multiple relationship with the number of AZs used for storing the encoded groups.

In an embodiment, when it needs to generate at least two global parity blocks, the data group comprises at least two parameter groups, the parameter groups comprising K encoding parameters respectively corresponding to the K data blocks; and encoding parameters in different parameter groups are different.

Figure 7:
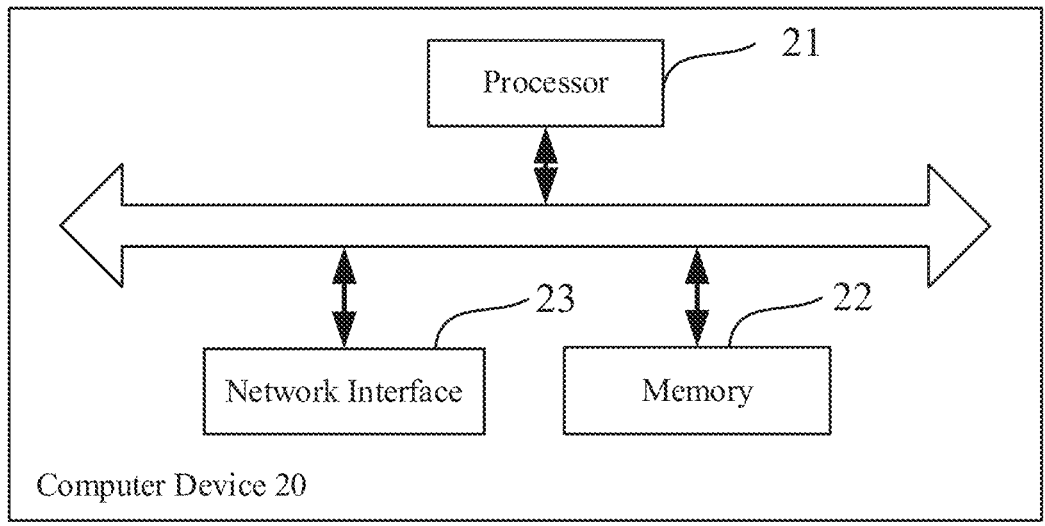
FIG. 7 is a structural schematic diagram of a computer device provided in an exemplary embodiment.

Correspondingly, with reference to FIG. 7, an embodiment of this specification further provides a computer device 20, comprising: a processor 21; and a memory 22 for storing instructions executable by processor 21; wherein processor 21 runs the executable instructions to implement the method of any one of the above.

Processor 21 executes the executable instructions included in memory 22. Processor 21 may be a central processing unit (CPU), or other general-purpose processor, a digital signal processor (DSP), an application specific integrated circuit (ASIC), a field-programmable gate array (FPGA) or other programmable logic devices, discrete gate or transistor logic devices, discrete hardware components, etc. A general-purpose processor may be a microprocessor, or this processor may be any conventional processor, etc.

Memory 22 stores executable instructions for implementing the method. Memory 22 may include at least one type of storage media including a flash memory, a hard disk, a multimedia card, a card-type memory (e.g., SD or DX memory, etc.), a random access memory. (RAM), a static random access memory (SRAM), a read-only memory (ROM), an electrically erasable programmable read-only memory (EEPROM), a programmable read-only memory (PROM), a magnetic memory, a magnetic disk, an optical disk, etc. Moreover, computer device 20 may cooperate with a network storage apparatus that executes a storage function of the memory through a network connection. Memory 22 may be an internal storage unit of computer device 20, such as a hard disk or memory of computer device 20. Memory 22 may also be an external storage device of computer device 20, such as a plug-in hard disk, a smart media card (SMC), a secure digital (SD) card, a flash card or the like equipped on computer device 20. Further, memory 22 may also include both an internal storage unit and an external storage device of computer device 20. Memory 22 is used for storing executable instructions and other programs and data needed by the device. Memory 22 may also be used for temporarily storing data that has been output or is to be output.

Exemplarily, as shown in FIG. 7, computer device 20 may also comprise a network interface 23 for data interaction with other devices through the network interface.

Various implementations described here may be implemented by using computer-readable media, such as computer software, hardware, or any combination thereof. For hardware implementations, the implementations described here may be implemented by using at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, an electronic unit designed to perform the functions described here. For software implementations, implementations of such as processes or functions may be implemented with separate software modules that allow at least one function or operation to be executed. Software codes may be implemented by a software application (or program) written in any suitable programming language, which may be stored in the memory and executed by a controller.

In an exemplary embodiment, there is further provided a non-transitory computer-readable storage medium comprising instructions, such as a memory comprising instructions that may be executed by a processor of an apparatus to complete the above method. For example, the non-transitory computer-readable storage medium may be a ROM, a random access memory (RAM), a CD-ROM, a magnetic tape, a floppy disk, an optical data storage device, etc.

The non-transitory computer-readable storage medium enables a terminal to execute the above method when the instructions in the storage medium are executed by a processor of the terminal.

According to the encoding method based on erasure code, the distributed system, the computer device and the storage medium provided in one or more embodiments of this specification, after acquiring K data blocks obtained by fragmenting data to be processed, the K data blocks can be divided into L data groups, and then when acquiring a local reconstruction parity block of each group of data blocks, at least part of data blocks in other data groups may be used for generating a local reconstruction parity block of the present data group, and the data groups and their local reconstruction parity blocks may be stored in data nodes of the distributed system, such that data recovery of a certain abnormal data block, when necessary, may be performed with the help of a local reconstruction parity block in other data groups, which is generated by using this abnormal data block, and other data blocks that generate this local reconstruction parity block, while the data security of a user is ensured, thereby reducing the number of blocks that need to be read, and thus lowering the amplification of IOPS for data recovery when data is lost or abnormal, and also reducing bandwidth loss during data recovery, and helping to improve the data recovery efficiency.

The systems, apparatuses, modules or units expounded in the above embodiments may be specifically implemented by computer chips or entities, or by products with certain functions. A typical implementing device is a computer, a specific form of which may be a personal computer, a laptop, a cellular phone, a camera phone, a smart phone, a personal digital assistant, a media player, a navigation device, an email transceiver, a game controller, a tablet, a wearable device, or a combination of any several of these devices.

In a typical configuration, the computer comprises one or more processors (CPUs), input/output interfaces, network interfaces, and memory.

The memory may include a non-permanent storage such as a random access memory (RAM), and/or non-volatile memory such as a read-only memory (ROM) or a flash RAM, in computer-readable media. The memory is an example of computer-readable media.

The computer-readable media include both permanent and non-permanent, both removable and non-removable media that may implement information storage by any method or technology. The information may be computer-readable instructions, data structures, modules of programs, or other data. Examples of computer storage media include, but are not limited to, a phase-change memory (PRAM), a static random access memory (SRAM), a dynamic random access memory (DRAM), other types of random access memory (RAM), a read-only memory (ROM), an electrically erasable programmable read-only memory (EE-PROM), a flash memory or other memory technologies, a compact disc read-only memory (CD-ROM), a digital versatile disc (DVD) or other optical storages, a cassette tape, a disk storage, a quantum memory, a graphene-based storage media, or other magnetic storage devices, or any other non-transmission media, which may be used to store information that may be accessed by a computing device. As defined herein, the computer-readable media do not include transitory computer-readable media, such as modulated data signals and carrier waves.

It should also be noted that terms "comprise", "include" or any other variants thereof are intended to cover a non-exclusive inclusion, such that a process, method, article, or device comprising a series of elements not only comprises these elements, but also comprises other elements not expressly listed, or elements inherent to such process, method, commodity or device. Without further limitation, an element defined by the statement "comprising a . . . " does not exclude the presence of additional identical elements in a process, method, commodity or device that comprises this element.

Described above are particular embodiments of this specification. Other embodiments are within the scope of the attached claims. In some cases, actions or steps recorded in the claims may be executed in a different order than in the embodiments, and may still achieve desired results. Additionally, processes depicted in the drawings do not necessarily require a particular or consecutive order to achieve desired results. In some implementations, multitasking and parallel processing are also possible or may be advantageous.

Terms used in one or more embodiments of this specification are only for the purpose of describing particular embodiments, and are not intended to limit one or more embodiments of this specification. Singular forms of "a/an", "the" and "this" used in one or more embodiments of this specification and the attached claims are also intended to include the plural forms, unless otherwise clearly indicated in the context. It should also be understood that the term "and/or" used herein refers to and includes any or all possible combinations of one or more associated items as listed.

It should be understood that although various information may be described employing terms such as first, second and third in one or more embodiments of this specification, such information should not be limited to these terms. These terms are only used for distinguishing information of the same type from each other. For example, without departing from the scope of one or more embodiments of this specification, the "first information" may also be referred to as "second information", and similarly, "second information" may also be referred to as "first information". Depending on the context, the word "if" used here may be interpreted as "when" or "as" or "to determine . . . in response to . . . "

Described above are merely preferred embodiments of one or more embodiments of this specification, which are not intended to limit one or more embodiments of this specification. Any modifications, equivalent replacements, improvements, or the like made within the spirit and principles of one or more embodiments of this specification should be included within the scope of protection of one or more embodiments of this specification.

What is claimed is:

1. An encoding method based on erasure code, comprising:

acquiring K data blocks of data to be processed;

dividing the K data blocks into L data groups, wherein each data group at least comprises K encoding parameters respectively corresponding to the K data blocks, wherein each data block has at least one corresponding encoding parameter, and K and L are integers greater than 1; and for each data group, performing encoding by using at least part of data blocks in other data groups and encoding parameters in the present data group, to generate a local reconstruction parity block of the present data group, wherein the encoding parameters in the present data group are corresponding to the at least part of data blocks in the other data groups, and wherein the data groups and the local reconstruction parity blocks are stored in data nodes of a distributed system.

2. The method according to claim 1, further comprising:

for each data group, performing encoding according to the K data blocks and the K encoding parameters, to generate a global parity block of the present data group; or, in a case that one or more local reconstruction parity blocks of the present data group are generated by using all data blocks in other data groups, generating a global parity block of the present data group according to data blocks in the present data group and corresponding encoding parameters, and the one or more local reconstruction parity blocks.

3. The method according to claim 2, further comprising:

acquiring L encoded groups corresponding to the L data groups after generating the global parity blocks, wherein each of the encoded groups comprises data blocks, the local reconstruction parity block and the global parity block of one of the data groups; and storing the L encoded groups in the data nodes of the distributed system.

4. The method according to claim 3, wherein the distributed system is deployed in a multi-availability zone environment, and each availability zone comprises one or more data nodes; and wherein each availability zone corresponds to at least one encoded group, and the at least one encoded group is stored in one or more data nodes in the availability zone.

5. The method according to claim 4, further comprising:

if it needs to read a target data block stored in a data node of an availability zone where abnormity arises, reading, from data nodes of other availability zones, a target local reconstruction parity block generated by using the target data block, and other data blocks for generating the target local reconstruction parity block; and recovering the target data block by using the target local reconstruction parity block and the other data blocks for generating the target local reconstruction parity block.

6. The method according to claim 1, wherein for each data group, if at least two local reconstruction parity blocks are generated, the part of data blocks used for respectively generating the at least two local reconstruction parity blocks are different from each other.

7. The method according to claim 1, wherein the number of the local reconstruction parity block in the data group is in a multiple relationship with the number of data blocks in the data group; and wherein the number of the part of data blocks in the other data groups, which are used by the local reconstruction parity block, is determined according to the multiple relationship.

8. The method according to claim 4, wherein the number of the data groups is determined according to the number of the availability zones; and/or, the number of the global parity blocks is in a multiple relationship with the number of the availability zones used for storing the encoded groups.

9. The method according to claim 2, wherein if it needs to generate at least two global parity blocks, the data group comprises at least two parameter groups comprising the K encoding parameters respectively corresponding to the K data blocks; and encoding parameters in different parameter groups are different.

10. The method according to claim 1, wherein the method is applied to a client in the distributed system; and/or the distributed system has several data nodes, and the method is applied to at least one data node.

11. A distributed system, comprising several data nodes, wherein the data nodes are in communication connection with a client, wherein the system further comprises a processor and a memory for storing processor-executable instructions, wherein the processor runs the executable instructions to:

acquire K data blocks of data to be processed;

divide the K data blocks into L data groups, wherein each data group at least comprises K encoding parameters respectively corresponding to the K data blocks, wherein each data block has at least one corresponding encoding parameter, and K and L are integers greater than 1; and for each data group, perform encoding by using at least part of data blocks in other data groups and encoding parameters in the present data group, to generate a local reconstruction parity block of the present data group, wherein the encoding parameters in the present data group are corresponding to the at least part of data blocks in the other data groups, and wherein the data groups and the local reconstruction parity blocks of the data groups are stored in the data nodes of the distributed system.

12. The distributed system according to claim 11, wherein the distributed system is deployed in a multi-availability zone environment, and each availability zone comprises one or more data nodes.

13. A computer device, comprising:

a processor; and a memory for storing processor-executable instructions;

wherein the processor runs the executable instructions to perform operations of:

acquiring K data blocks of data to be processed;

dividing the K data blocks into L data groups, wherein each data group at least comprises K encoding parameters respectively corresponding to the K data blocks, wherein each data block has at least one corresponding encoding parameter, and K and L are integers greater than 1; and for each data group, performing encoding by using at least part of data blocks in other data groups and encoding parameters in the present data group, to generate a local reconstruction parity block of the present data group, wherein the encoding parameters in the present data group are corresponding to the at least part of data blocks in the other data groups, and wherein the data groups and the local reconstruction parity blocks are stored in data nodes of a distributed system.

14. A non-transitory computer-readable storage medium, storing computer instructions, wherein the computer instructions, when executed by a processor, implement steps of the method of claim 1.

15. The computer device according to claim 13, wherein the processor runs the executable instructions to perform further operations of:

for each data group, performing encoding according to the K data blocks and the K encoding parameters, to generate a global parity block of the present data group; or, in a case that one or more local reconstruction parity blocks of the present data group are generated by using all data blocks in other data groups, generating a global parity block of the present data group according to data blocks in the present data group and corresponding encoding parameters, and the one or more local reconstruction parity blocks.

16. The computer device according to claim 15, wherein the processor runs the executable instructions to perform further operations of:

acquiring L encoded groups corresponding to the L data groups after generating the global parity blocks, wherein each of the encoded groups comprises data blocks, the local reconstruction parity block and the global parity block of one of the data groups; and storing the L encoded groups in the data nodes of the distributed system.

17. The computer device according to claim 16, wherein the distributed system is deployed in a multi-availability zone environment, and each availability zone comprises one or more data nodes; and wherein each availability zone corresponds to at least one encoded group, and the at least one encoded group is stored in one or more data nodes in the availability zone.

18. The computer device according to claim 17, wherein the processor runs the executable instructions to perform further operations of:

if it needs to read a target data block stored in a data node of an availability zone where abnormity arises, reading, from data nodes of other availability zones, a target local reconstruction parity block generated by using the target data block, and other data blocks for generating the target local reconstruction parity block; and recovering the target data block by using the target local reconstruction parity block and the other data blocks for generating the target local reconstruction parity block.

19. The computer device according to claim 13, wherein for each data group, if at least two local reconstruction parity blocks are generated, the part of data blocks used for respectively generating the at least two local reconstruction parity blocks are different from each other.

20. The computer device according to claim 13, wherein the number of the local reconstruction parity block in the data group is in a multiple relationship with the number of data blocks in the data group; and wherein the number of the part of data blocks in the other data groups, which are used by the local reconstruction parity block, is determined according to the multiple relationship.

* * * * *